US010055585B2

(12) United States Patent
Dalcher et al.

(10) Patent No.: US 10,055,585 B2
(45) Date of Patent: Aug. 21, 2018

(54) HARDWARE AND SOFTWARE EXECUTION PROFILING

(71) Applicant: INTEL CORPORATION, Santa Clara, CA (US)

(72) Inventors: Greg William Dalcher, Tigard, OR (US); Ravi L. Sahita, Portland, OR (US); Palanivelra Shanmugavelayutham, San Jose, CA (US); Koichi Yamada, Los Gatos, CA (US); Arvind Krishnaswamy, San Jose, CA (US)

(73) Assignee: McAfee, LLC, Santa Clara, CA (US)

( * ) Notice: Subject to any disclaimer, the term of this patent is extended or adjusted under 35 U.S.C. 154(b) by 44 days.

(21) Appl. No.: 14/129,246

(22) PCT Filed: Aug. 28, 2013

(86) PCT No.: PCT/US2013/057064
§ 371 (c)(1),
(2) Date: Apr. 10, 2014

(87) PCT Pub. No.: WO2015/030748
PCT Pub. Date: Mar. 5, 2015

(65) Prior Publication Data
US 2015/0067763 A1    Mar. 5, 2015

(51) Int. Cl.
G06F 21/54    (2013.01)
G06F 21/56    (2013.01)
G06F 21/55    (2013.01)

(52) U.S. Cl.
CPC .......... *G06F 21/566* (2013.01); *G06F 21/554* (2013.01)

(58) Field of Classification Search
CPC ........ G06F 21/54; G06F 21/566; G06F 21/10; H04L 29/06578; H04L 29/06986; H04L 63/0227; H04L 63/20
(Continued)

(56) References Cited

U.S. PATENT DOCUMENTS 6,304,960 B1 * 10/2001 Yeh ..................... G06F 9/30072
                                                                712/236
8,214,900 B1    7/2012 Satish et al.
(Continued)

FOREIGN PATENT DOCUMENTS

CN        103154908       6/2013
JP       2009-129204 A    6/2009

OTHER PUBLICATIONS

International Search Report and Written Opinion received for PCT Patent Application No. PCT/US2013/057064, dated May 27, 2014, 12 pages.
(Continued)

*Primary Examiner* — William J. Goodchild
(74) *Attorney, Agent, or Firm* — Byrne Poh LLP

(57) ABSTRACT

Technologies for assembling an execution profile of an event are disclosed. The technologies may include monitoring the event for a branch instruction, generating a callback to a security module upon execution of the branch instruction, filtering the callback according to a plurality of event identifiers, and validating a code segment associated with the branch instruction, the code segment including code executed before the branch instruction and code executed after the branch instruction.

20 Claims, 4 Drawing Sheets

(58) Field of Classification Search
USPC .............................................................. 726/1
See application file for complete search history.

(56) References Cited

U.S. PATENT DOCUMENTS

| | | | |
|---|---|---|---|
| 2005/0010804 A1* | 1/2005 | Bruening | G06F 21/52 |
| | | | 726/1 |
| 2006/0095895 A1 | 5/2006 | K. | |
| 2007/0089171 A1* | 4/2007 | Aharon | G06F 21/55 |
| | | | 726/22 |
| 2008/0091928 A1 | 4/2008 | Eickemeyer et al. | |
| 2008/0256346 A1* | 10/2008 | Lee | G06F 9/322 |
| | | | 712/239 |
| 2011/0264894 A1* | 10/2011 | Lin | G06F 9/322 |
| | | | 712/207 |
| 2011/0289300 A1 | 11/2011 | Beaumont-Smith et al. | |
| 2013/0047255 A1 | 2/2013 | Dalcher | |

OTHER PUBLICATIONS

European Extended Search Report from Patent Application No. 13892527.6, dated Dec. 9, 2016; 9 pages.
International Report on Patentability, Application No. PCT/US2013/057064; 9 pages, dated Mar. 10, 2016.
Office Action for Chinese Patent Application No. 201380078561.7, dated Oct. 25, 2017; 16 pages.

* cited by examiner

HARDWARE AND SOFTWARE EXECUTION PROFILING

TECHNICAL FIELD

This invention relates generally to the field of electronic security and more specifically to hardware and software execution profiling.

BACKGROUND

In the realm of electronic security, electronic security products often find themselves one step behind the proprietor and distributors of harmful software. Many traditional approaches to electronic security take as their starting point the identification of threats and reaction to these threats. This reactive approach may protect electronic devices against known threats, but leaves them vulnerable to unknown threats. Further, this reactive approach requires constant vigilance and updating of the electronic device in order to keep up with the latest advancements in harmful software.

BRIEF DESCRIPTION OF THE DRAWINGS

For a more complete understanding of the present invention and its advantages, reference is now made to the following description, taken in conjunction with the accompanying drawings, in which.

DESCRIPTION OF THE EMBODIMENTS

In modern electronic systems, one major issue remains electronic security. A constant threat to the security of an electronic system is the threat of assimilation of system resources through means other than those intended by the user of the system. These means may take the form of software, hardware, firmware, or some combination thereof, and may include computer viruses, worms, spyware, adware, or other means that may gather information from an infected electronic device, corrupt the device, or have some other deleterious effect. These means may be generally referred to as "malware."

One particularly nefarious breed of malware may insert itself into electronic device's event processing routines in order to subvert, monitor, and/or alter these processes. For example, a key-stroke logging software may be inserted into the handling of keystrokes in order to capture these keystrokes. Another type of malware may make use of "return-oriented programming," in which the malware seeks to take advantage of return calls to various stacks and/or registers of the host computer in order to insert malicious code of its own.

Malware may be generally characterized by a need to be inserted into the handling of an event of some sort, even if only to be scheduled for execution by the system. Detecting malware's presence in an event processing is valuable, but often difficult. For example, malware may be included in an event's processing by indirect methods such as taking advantage of a vulnerability of the electronic device itself (an "exploit"). Some prior electronic security software has been able to discover which insertion methods may be used and monitoring these insertion methods (e.g., the known vulnerabilities). For example, in the case of a key-stroke logger, the method of insertion may be an exploit of an application programming interface ("API"). One historic method of dealing with this vulnerability has been to monitor the API in order to detect subversion of the normal operation.

Reactive approaches to detection such as this may make it difficult to keep pace with changes to malware insertion techniques. An improved approach may be one that allows for detection of the presence of malware in an event's processing regardless of the insertion method. Additionally, it may be beneficial to also support using assembled execution profiles to validate the invoker of an API (such as a privileged API).

Figure 1:
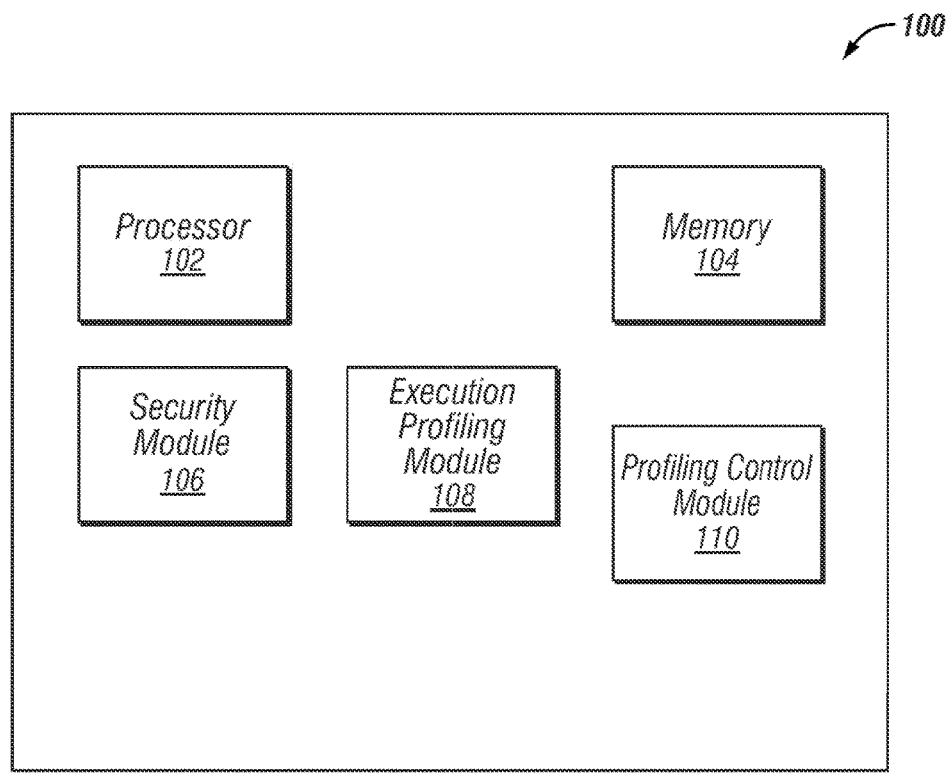
FIG. 1 illustrates an example system for detecting the presence of malware in an event's processing regardless of the insertion method, in accordance with certain embodiments of the present disclosure.

FIG. 1 illustrates an example system 100 for detecting the presence of malware in an event's processing regardless of the insertion method, in accordance with certain embodiments of the present disclosure. System 100 may include processor 102, memory 104, security module 106 communicatively coupled to processor 102, execution profiling module 108 communicatively coupled to processor 102, and profiling control module 110 communicatively coupled to processor 102.

Execution profiling module 108, security module 106, and/or profiling control module 110 may be configured to execute on any suitable portion of system 100. They may be configured to execute on, for example, a server, computer, node, gateway, router, transmitter, or receiver. System 100 may be implemented by any suitable electronic device and/or combination of electronic devices, such as: computer(s), laptop(s), cloud computing server(s), blade(s), desktop(s), rack server(s), mobile device(s), and/or web server(s). In some embodiments, system 100 may be implemented by one or more microprocessor(s), microcontroller(s), application-specific integrated circuit(s), and/or other appropriate electronic devices in a system on a chip ("SoC") configuration.

In some embodiments, some or all of the functions performed by execution profiling module 108, security module 106 and/or profiling control module 110 may be performed by one or more security agent(s). Security agents may be installed to run on a variety of electronic devices, including computers, laptops, cloud computing servers, blades, desktops, rack servers, mobile devices, and/or web servers.

In some embodiments, processor 102 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104. Memory 104 may be configured in part or whole as application memory, system memory, or both. Memory 104 may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of system 100, such as configurations of components such as execution profiling module 108, security module 106, and/or profiling control module 110 may reside in memory 104 for execution by processor 102.

In some embodiments, system 100 may monitor execution of select activities. That is, system 100 may allow for generic runtime detection of unauthorized software. For example, system 100 may allow a user of a system 100 to determine from where a software execution flow originated and to where the execution flow may continue. In the same or alternative embodiments, system 100 may discover code involved in the handling of a traced event. For example, system 100 may discover code involved in the handling of an input-output ("I/O") event, the return from invocation of a privileged API, etc.

In some embodiments, system 100 may be configured to detect unauthorized software without the use of signatures, plugging, monitoring individual known exploits, and/or other methods of identifying malicious software based on prior knowledge of the behavior of unauthorized software. That is, system 100 may be configured to detect previously unknown versions of a piece of unauthorized software, and/or may not require frequent updating of monitoring software in response to changes to system software.

In some embodiments, system 100 may include security module 106. Security module 106 may be configured to monitor execution of select activities. Security module 106 may be configured to receive output from execution profiling module 108 to detect unauthorized software. For example, security module 106 may be an agent executing on system 100 configured to apply security policies to data gleaned regarding the execution profiles of identified events.

In some embodiments, system 100 may also include profiling control module 110. Profiling control module 110 may be configured to interface with security module 106 in order to inform security module 106 of changes in applicable security policies and/or other relevant information. For example, profiling control module 110 may communicate new types of execution event policies, filtering rules, and/or callback conditions to execution profiling module 108 and/or security module 106. Profiling control module 110 may also be configured to handle new execution profiling events in order to create and/or optimize anti-malware heuristics (e.g., return-oriented programming detection, API misuse, and/or general code injection).

In some embodiments, system 100 may include execution profiling module 108. Execution profiling module 108 may be configured to implement and provide execution profiling and monitoring capability. In some embodiments, execution profiling module 108 may be implemented through hardware, software, and/or some combination thereof. For example, execution profiling module 108 may be implemented through the use of Binary Translation techniques (or other appropriate code emulation techniques) and/or CPU hardware extensions developed for use with execution profiling module 108. As an example of the latter, CPU extensions may be developed based on branch trapping.

In some embodiments, execution profiling module 108 may be configured to invoke callbacks to security module 106 when specified criteria are met. For example, execution profiling module 108 may: invoke a callback to security module 106 when an event to be traced is identified and/or generated, enable generation of callbacks when certain branch instructions execute (any appropriate code segment that may depend on and/or alter an execution flow at a particular point, e.g., CALL, JMP, RET); generate callbacks through binary translation (software-based and/or hardware-assisted), existing CPU Debug Break on Branch, and/or other CPU extensions; filter callbacks by an identifier (e.g., a software process ID) associated with a process and/or thread executing an instruction, wherein the identifier may be determined by an examination of CPU register contents; identify code involved in a branch (pre- and/or post-branch) while handling callbacks; check identified code for validity (e.g., a signature check, a scan for malware); check identified code for desirability (or necessity) of its inclusion in handling the traced event; and/or check for use of return-oriented programming techniques. In the same or alternative embodiments, execution profiling module 108 may be further configured, when checking for the use of return-oriented programming techniques, to examine the call stack at a point of branch to verify whether it is legitimate or induced by return-oriented programming. An example of the means by which this examination may be performed may be found in U.S. Pat. No. 7,987,451, which is hereby incorporated by reference.

In the same or alternative embodiments, execution profiling module 108 may be configured to invoke callbacks to security module 106 in order to perform checks when other criteria are met. For example, callbacks may be invoked upon stack pivot usage (e.g., a switch from using a legitimate, operating system-supplied stack of thread to an allocated stack), manipulation of return addresses already present in the call stack (e.g., overwriting return addresses placed in the stack legitimately), and/or other forms of illegitimate manipulation of call frames and/or call frame data. In some embodiments, these checks may be coupled with identification and examination of code at a destination of a new return address and/or a check of the legitimacy of identified code.

In some embodiments, security module 106 may be implemented as either a high-level and/or a low-level module, depending on the performance needs of a given implementation. For example, security module 106 (and/or execution profiling module 108) may be implemented as hardware, software stored on computer-readable media, firmware, and/or some combination thereof, either as stand-alone modules and/or integrated into other parts of system 100.

In operation, system 100 may operate to detect unauthorized software based on execution profiles rather than signatures or other static pattern matching. That is, system 100 may identify unauthorized software based on behavioral and/or runtime solutions. An approach based on execution profiling may avoid some of the disadvantages associated with other techniques. For example, unlike host intrusion prevention systems (and other behavioral approaches) that rely on API usage heuristics, execution profiling may be less susceptible to return-oriented programming attacks, hook skipping, hook tempering, etc. Execution profiling may, for example, address such attacks on a zero-day basis without requiring expensive hooking approaches. As an additional example, other types of malware identification systems may employ software fault isolation to de-privilege untrusted processes from performing certain types of system operations. However, this type of approach may not be effective on attacks on trusted and/or privileged code. In order to address these and other concerns, execution profiling may identify unauthorized software without prior knowledge or discovery of target code addresses; rather, these may be discovered during the monitoring of execution flow.

As described in further detail below with reference to FIG. 2-4, execution profiling module 108 may identify unauthorized software through the generation of control transfer events as and when a control transfer is performed by processor 102 within a process execution context. When the event is triggered, an execution profile may be assembled to enable security module 106 to handle the event.

In some embodiments, execution profiling module 108 may be triggered by an artificial event (e.g., a test event) or a natural event (e.g., due to a callback API invocation arising from a keystroke from the user; a return from invocation of privileged API; etc.). In some embodiments, system 100 may support an implementation of event triggers that may be possible through the use of extensions to processor 102. These event triggers may include triggers when certain processes, instructions, and/or other parameters are met. For example, event triggers that may be possible through extensions to processor 102 may include: (1) instruction of family x executed (e.g., a monitor that triggers when any CALL and/or RET instruction is executed. These may be prioritized based on the particular configuration of system 100. For example, the prioritization may be: (i) RET instruction monitoring, (ii) CALL instruction monitoring, and (iii) JMP instruction monitoring. Known to one of ordinary skill in the art, a RET instruction typically returns stack parameters, a CALL instruction typically requests stack parameters, and a JMP instruction typically implements an unconditional jump, transferring execution flow by changing the instruction pointer register); (2) when triggered, event invoke a registered callback for handling of the events (callback invocation may be screened at a very low level using filters to minimize performance impact, as described in more detail below and with reference to FIGS. 2-4); (3) callbacks to support a variety of operations (e.g., hold of triggering operation while the callback handler processes notification; identification of the triggering event; access to memory and registers present at time of event trigger; access to last branch record ("LBR"); per-core sequence number, incremented each time an event is triggered; ability to perform operations within callback handler without triggering additional event callbacks, hopefully avoiding recursion; etc.); and (4) ability to add, remove, and/or update callback registrations while system is executing.

Execution profiling module 108 may identify event information that may describe the process(es) and/or thread(s) to be monitored, as well as any branch instructions that may be monitored. Execution profiling module 108 may also identify any to- and/or from-code associated with an identified branch as well as the ownership of any code. Based on the collected information, execution profiling module 108 may generate a callback to software module 106 when specified branch instruction types are executed by particular processes and/or threads.

Upon callback, security module 106 may determine the validity of the identified executable file via signing checks, legitimacy checks (i.e., should a particular executable be involved in handling a particular event), and/or other appropriate validity check. Security module 106 may also perform runtime scanning of the code involved, particularly if the code is neither packed nor encrypted. Security module 106 may also check for certain software insertion techniques such as return-oriented programming techniques. For example, as described in more detail above and with reference to U.S. Pat. No. 7,987,451, caller validation may be applied to call frames identified through interception of CALL/RET instructions.

In operation, execution profiling module 108 may make use of events associated with processor 102 (e.g., control transfers) to identify all code in handling a specific higher-level event (whether software- and/or user-generated). Execution profiling module 108 may be further configured to limit the scope of monitoring and facilitate filtering of branch tracing callbacks to limit these to only branches pertinent to handling of the instruction execution event.

In some embodiments, execution profiling module 108 may be configured to take advantage of hardware extensions to processor 102. For example, processor 102 may be configured to include monitoring extensions, last-branch-record ("LBR") extensions, low-level filtering extensions, and/or other appropriate extensions configured to assist in the detection of unauthorized software through execution profiling.

In some embodiments, execution profiling module 108 may be configured to make use of low-level filtering extensions to processor 102. For example, execution profiling module 108 may be able to apply filtering to control both invocation of monitoring callbacks and the inclusion of a branch in LBR. These filtering mechanisms may be implemented at a low-level for efficiency in processing power, memory, and/or other performance considerations. In some embodiments, the filtering criteria may include certain process and/or thread identifiers, particular commands, and/or other appropriate criteria. For example, execution profiling module 108 may filter based on certain register and/or stack values of processor 102. As an illustrative example, execution profiling module 108 may filter based on a value stored in control register number 3 ("CR3"), e.g., the Program ID. Execution profiling module 108 may also filter based on a stack pointer range (e.g., thread ID); branch instruction type (e.g., CALL RET, JMP); and/or other additional and/or secondary criteria (e.g., include first n instructions matching primary criteria; exclude first n instruction matching primary criteria; include only instructions executing from within specified address range(s)).

Execution profiling module 108 may also be configured to take advantage of monitoring extensions to processor 102 for invoking a callback prior to execution of specified instruction forms subject to the low-level filtering described in more detail above.

Execution profiling module 108 may also be configured to take advantage of LBR extensions to processor 102 for making use of LBR techniques as well as potentially expanding its capabilities. For example, LBR extensions may expand LBR to support greater depth (e.g., longer history supported than the current 16-entry limit); inclusion of additional information in each entry (e.g., CR3 and/or estended stack pointer ("ESP") value prior to executing a control transfer); and filtering of insertion of control transfers in a list based on certain criteria such as CR3 and/or ESP value prior to executing a control transfer, instruction pointer value prior to executing a control transfer, and/or instruction type. With respect to instruction type, this criteria may be conditional, e.g., only record control transfers that are long-jumps, only record control transfers due to RETS, etc. Extensions may also allow the ability to change filtering while system 100 is executing, including during handling of processor 102-based callbacks.

These extensions may also make use of the low-level filtering described in more detail above to control inclusion in LBR.

In order to demonstrate the use of certain extensions in the detection of unauthorized software, two illustrative examples are provided: detection of event-sniffing malware and detection of unauthorized invocation of a privileged API.

Figure 2:
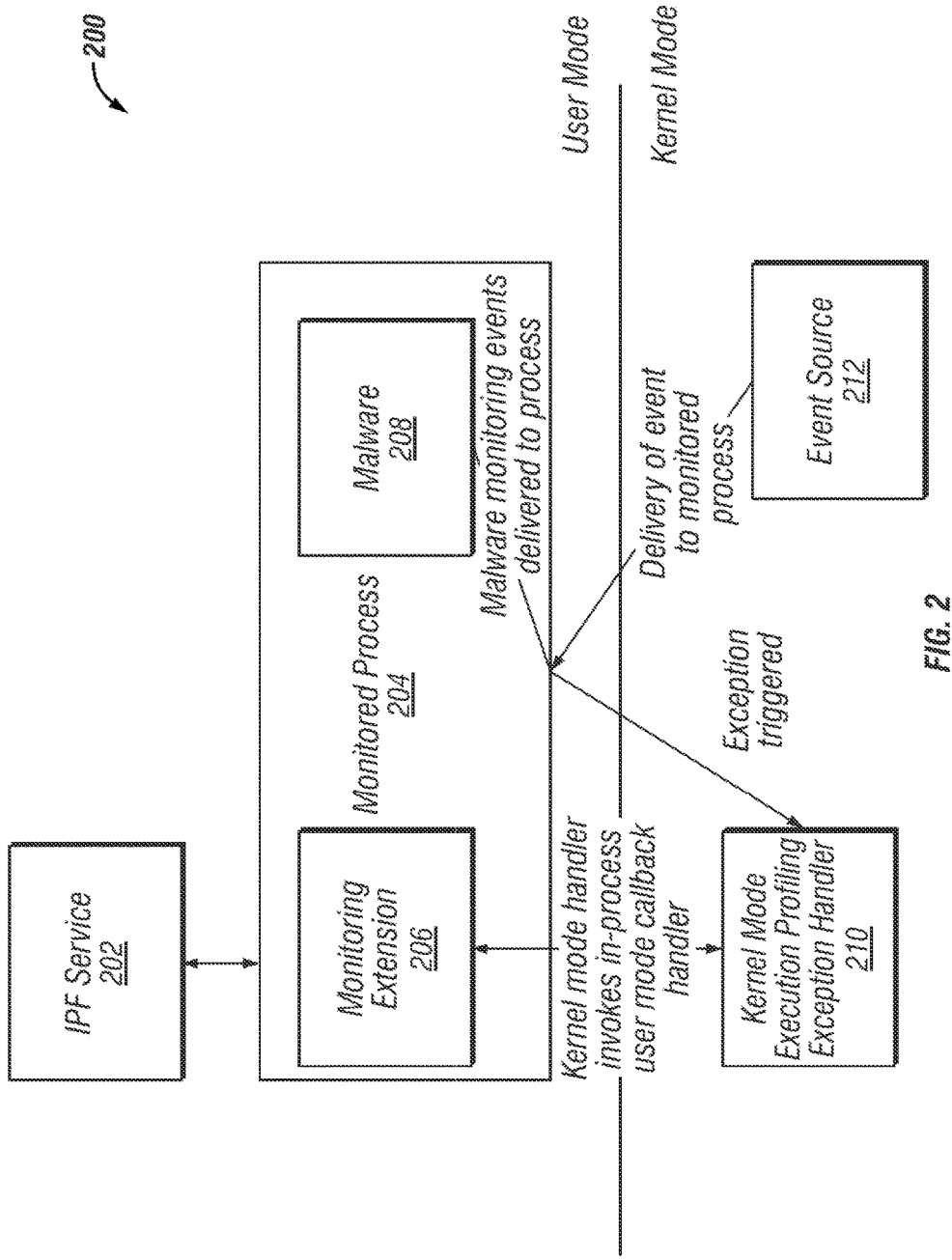
FIG. 2 illustrates an example system for detecting event-sniffing malware, in accordance with certain embodiments of the present disclosure.

FIG. 2 illustrates an example system 200 for detecting event-sniffing malware, in accordance with certain embodiments of the present disclosure. In some embodiments, system 200 may include in-process filter ("IPF") service 202, monitored process 204, kernel module execution profiling exception handler 210, and event source 212. In some embodiments, monitored process 204 may include monitoring extension 206 and malware 208.

In some embodiments, malware 208 may insert itself into handling of an event of interest such as keystrokes sent to user-mode software. Malware 208 may intercept these events and siphon off data it may be interested in (e.g., pressed keys).

As described in more detail above with reference to FIG. 1, system 100 may take advantage of certain hardware extensions that may be present within processor 102. For example, processor 102 may include extensions for monitoring specified branch instructions for a specific process and/or thread. In some embodiments, monitoring may be disabled by default and enabled only when a test event is present to system 100 for handling. In the same or alternative embodiments, monitoring may be enabled for a certain program(s), process(es), thread(s), and/or other criteria. Referring again to FIG. 2 for example, monitoring may be enabled for events associated with an internet browser as well as events associated with RET instructions. Event source 212 may then be configured to send a test keystroke to the browser.

In some embodiments, event source 212 may be any appropriate software, hardware, firmware, and/or other electronic resource configured to generate a test event in accordance with an event desired to be monitored. In some embodiments, event source 212 may be configured to generate an event associated with a specific program, process, and/or other parameter. In the illustrative example provided, monitoring has been turned on for all events associated with an Internet browser. However, in other examples, it may be possible to tune monitoring to apply to a specific process/thread combination.

With monitoring enabled, all RET instructions performed by the browser during the handling of the keystroke test event may be trapped by monitoring extension 206 and routed to a callback to kernel module execution profiling exception handler 210. In some embodiments, monitoring extension 206 may be an extension to processor 102 as described in more detail above with reference to FIG. 1. The callback may note the current instruction pointer and/or other register contents. The callback may also note other data of interest, such as the content of the first n bytes from the top of the stack. This data may be analyzed collectively or in segments, asynchronously, and/or synchronously. When handling of the test keystroke is completed, monitoring may be disabled.

Analysis of the collected information from the monitoring callbacks may identify code executing each of the RET instructions and the code the RET instructions returned to. Identification may include determining what backing executable may own the code. The validity of the backing executable may then be determined, such as through a check that it is signed by a trusted source. In some embodiments, the analysis may be performed by monitoring extension 206. In the same or alternative embodiments, some or all of the analysis may be performed by different hardware extensions, software modules, firmware, and/or other electronic resources associated with system 100.

If, during the handling of the test event, a piece of code is unable to be validated as legitimate, kernel module execution profiling exception handler 210 may generate a security violation.

In addition to monitoring extension 206, system 200 may also include one or more LBR extensions associated with processor 102. In some embodiments. LBR filtering may be put in place to add RET instructions for a browser's processor ID. At the end of handling of a test keystroke event, LBR contents may be retrieved and analyzed in the same manner as with data collected from monitoring extension 206.

In operation, event source 212 may generate a test event of interest to system 200. The test event may be delivered by the operating system to monitored process 204. Malware 208 within monitored process 204 may monitor keystroke events delivered to monitored process 204. An execution profiling exception may be triggered by execution profiling module 108 of system 100 and delivered to kernel mode execution profiling exception handler 210. Exception handler 210 may then invoke an in-process user mode callback handler to monitoring extension 206. Monitoring extension 206 may then analyze the execution of the profiling event in the context of the original thread. Monitoring extension 206 may then communicate the detection results to profiling control module 202. In some embodiments, profiling control module 202 may be configured to control the reactions of system 200 to the detection results.

Configurations similar to system 300 may also be implemented for detecting unauthorized invocation of a privileged API without departing from the scope of the present disclosure. For example, just prior to returning from a privileged API, monitoring extension 206 may be configured to be enabled for RET instructions for the invoking process(es) and/or thread(s). When handling of APIs' return is judged to be completed, monitoring data may be retrieved and monitoring disabled. As with the application to test event handling, data collected for all RETs may be observed from the specified process/thread during handling of return from privileged APIs. Code involved for these observed RETs may be identified and a determination made that the code involved is authorized to have been in the chain of invocation of the API. If the unauthorized code is detected, a security violation may be generated. Further, LBR filtering may be enabled to only include RET instructions from the process and/or thread that invoked the API.

Figure 3:
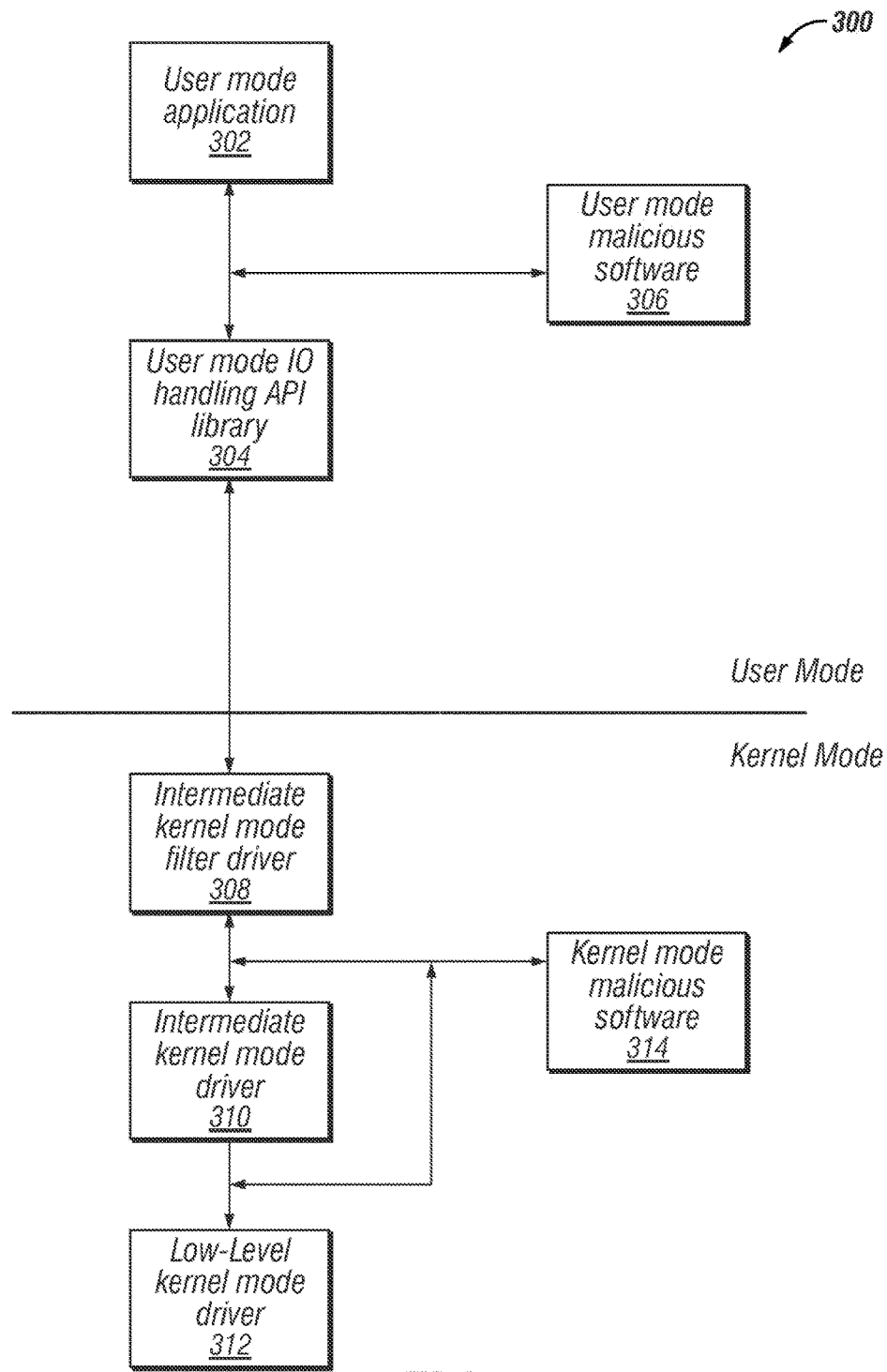
FIG. 3 illustrates an example system for handling both user mode and kernel mode malware, in accordance with certain embodiments of the present disclosure.

FIG. 3 illustrates an example system 300 for handling both user mode and kernel mode malware, in accordance with certain embodiments of the present disclosure. In some embodiments, system 300 may include user mode application 302 communicatively coupled to user mode I/O-handling API library. User mode application 302 may be any application utilizing user input, being run for the benefit of a user, or any other appropriate user application. User mode application 302 may be communicatively coupled to user mode IO handling API library 304. Library 304 may be any appropriate collection of APIs, API functions, or any other API-related information associated with IO-handling APIs.

In some embodiments, user mode malicious software 306 may monitor JO between user mode application 302 and user mode IO handling API library 304. For example, malicious software 306 may be software designed to invoke a privileged API in an unauthorized manner. As described in more detail above with reference to FIGS. 1-2, execution profiling may be used to detect user mode malicious software 306.

System 300 may also include intermediate kernel mode filter driver 308 communicatively coupled to intermediate kernel mode driver 310, which may also be communicatively coupled to low-level kernel mode driver 312. In some embodiments, intermediate kernel mode filter driver 308, intermediate kernel mode driver 310, and low-level kernel mode driver 312 may be implemented in hardware, software, firmware, and/or some combination thereof and may be stored an executed as part of processor 102 and memory 104 of system 100. In some embodiments, system 300 may also include kernel mode malicious software 314. For example, malicious software 314 may be a key-logging software configured to monitor, store, and/or communicate key strokes inputted by a user for the benefit of user mode application 302 (e.g., a web browser). As described in more detail above with reference to FIGS. 1-2, execution profiling may be used to detect user mode malicious software 314.

As described in more detail above with reference to FIG. 1, intermediate kernel model filter driver 308, intermediate kernel mode driver 310, and low-level kernel mode driver 312 may be configured to implement the filtering described above with reference to FIG. 1. These filters may be used in order to provide sufficient screening of events at a low level to minimize the performance impact of assembling the execution path taken by monitored software. Filtering prior to exception generation may help to significantly reduce performance impact.

These event filters may include new types of filters applied prior to sending events to a monitoring callback. These filters may be generally grouped into five categories: (1) filtering based on register values (e.g., a CR3 value; a CR3 value coupled with an extended stack pointer ("ESP") value, checking for a value being within a range; an instruction pointer value, checking for the value being within a range; etc.); (2) filtering based on the logical negation of a category (1) filter (e.g., trigger fault when the CR3 value does not match a specified value); (3) logically combining multiple filters)(e.g., invoking a callback only when particular CR3 and ESP values are present and the instruction pointer value is outside a specified range; if CR3 contains a specific value; etc.); (4) sufficiently high limit of supported filter registrations; and (5) ability to register, unregister, and change filter registration while the system is executing.

Applying these filters to event monitoring may allow for an efficient means of creating a profile of the execution for certain software of interest. Such an approach may allow for unauthorized software to be identified without prior knowledge of the software's properties.

Figure 4:
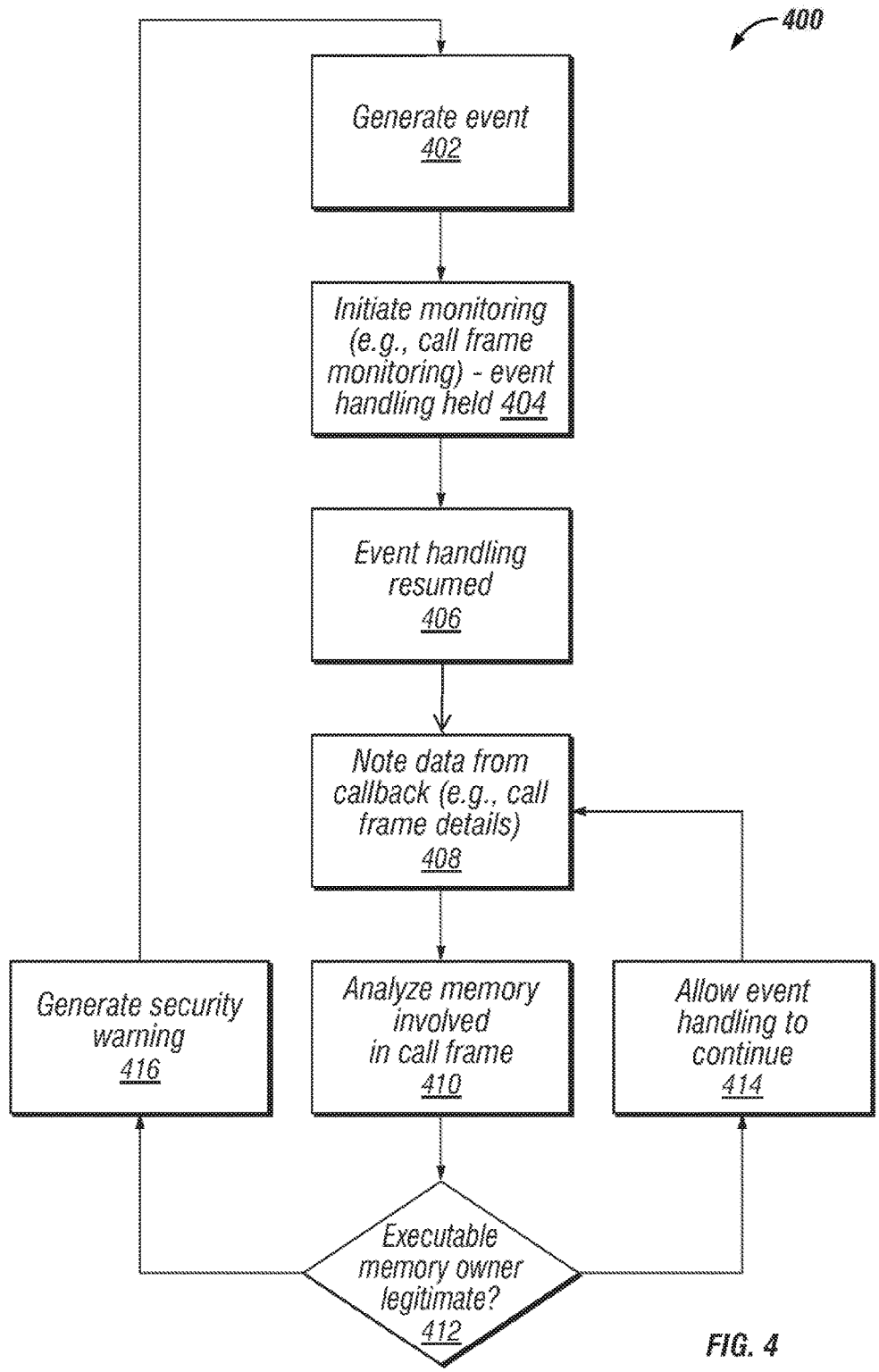
FIG. 4 illustrates a flowchart of an example method for assembling execution profiles, in accordance with certain embodiments of the present disclosure.

FIG. 4 illustrates a flowchart of an example method 400 for assembling execution profiles, in accordance with certain embodiments of the present disclosure. Method 400 includes generating an event, holding an event, resuming event handling, noting a call frame, analyzing involved executable memory, identifying an owner, and detecting malware.

According to one embodiment, method 400 preferably begins at 402. Teachings of the present disclosure may be implemented in a variety of configurations. As such, the preferred initialization point for method 400 and the order of 402-416 comprising method 400 may depend on the implementation chosen.

In some embodiments, method 400 may be performed by some or all of the components of system 100, as described in more detail above with reference to FIGS. 1-3. For example, in some configurations, execution profiling module 106 may be responsible for analyzing the executable memory involved. In other configurations, this may be performed by different components of system 100 with departing from the scope of the present disclosure.

At 402, method 400 may generate a test event. As described in more detail above with reference to FIG. 1-3, an event may be artificial or natural. The event may be generated internally or externally to system 100. After the event has been generated, method 400 may proceed to 404.

At 404, method 400 may hold the event generated at 402 in order to initiate monitoring of the event. For example, as described in more detail above with reference to FIGS. 1-3, method 400 may initiate call frame monitoring associated with the event. Once monitoring has been initiated, method 400 may proceed to 406, where event handling may resume. Once handling is resumed, method 400 may proceed to 408.

At 408, method 400 may begin the monitoring routine. For example, method 400 may note the first call frame associated with the event. Once monitoring has begun, method 400 may proceed to 410, at which point data associated with the event may be analyzed as described in more detail above with reference to FIGS. 1-3. For example, the executable memory involved in the noted call frame may be analyzed. Once the analysis is complete, method 400 may proceed to 412.

At 412, method 400 may attempt to validate the code associated with the monitored event. For example, as described in more detail above with reference to FIGS. 1-3, method 400 may determine wither the owner of the analyzed executable memory is legitimate. If it is determined to be legitimate, method 400 may proceed to 414, at which point event handling may be allowed to continue before incrementing the monitoring (e.g., advancing to the next call frame) and returning to 408. If it is determined to not be legitimate, method 400 may proceed to 416, at which point a security warning may be issued and unauthorized software may be detected. After the security warning is generate, method 400 may return to 402 to begin the process once again.

Although FIG. 4 discloses some embodiments of method 400, method 400 may include more or less than that depicted in FIG. 4. In addition, although FIG. 4 discloses a certain order, method 400 may be completed in any suitable order. For example, in the embodiment of method 400 shown, monitoring is performed in a synchronous manner. However, in some configurations it may be necessary or desirable to perform this analysis in a non-realtime, asynchronous manner.

A system for assembling an execution profile of an event is disclosed. The system may include a processor, a security module communicatively coupled to the processor, and an execution profiling module communicatively coupled to the processor and the security module. The execution profiling module configured to monitor the event for a branch instruction, generate a callback to the security module upon execution of the branch instruction, filter the callback according to a plurality of event identifiers, and validate a code segment associated with the branch instruction, the code segment including code executed before the branch instruction and code executed after the branch instruction. The system may also include a profiling control module communicatively coupled to the security module and the execution profiling module, the profiling control module configured to manage security policies for the system The execution profiling module may be further configured to check the code segment for use of return-oriented programming techniques. The execution profiling module may be configured to monitor the event for the branch instruction using binary translation-based techniques.

The processor may also include a monitoring extension configured to provide an event trigger for use in monitoring the event for the branch instruction.

The event trigger may include a trigger when an instruction of a particular type is executed and/or a trigger invoking a registered callback for handling of the event.

The plurality of event identifiers May include process identifiers, thread identifiers, and/or register values.

The execution profiling module may be configured to invoke callbacks to the security module in order to perform checks when other criteria are met. For example, callbacks may be invoked upon stack pivot usage (e.g., a switch from using a legitimate, operating system-supplied stack of thread to an allocated stack), manipulation of return addresses already present in the call stack (e.g., overwriting return addresses placed in the stack legitimately), and/or other forms of illegitimate manipulation of call frames and/or call frame data. In some embodiments, these checks may be coupled with identification and examination of code at a destination of a new return address and/or a check of the legitimacy of identified code.

The security module and/or execution profiling module may be implemented as either a high-level and/or a low-level module, depending on the performance needs of a given implementation. For example, security module and/or execution profiling module may be implemented as hardware extensions and/or as instructions contained on computer-readable media and executable by a processor.

At least one machine readable storage medium is disclosed. The medium may include computer-executable instructions stored on the computer readable medium, the instructions readable by a processor, the instructions, when read and executed, for causing the processor to monitor the event for a branch instruction, generate a callback to a security module upon execution of the branch instruction, filter the callback according to a plurality of event identifiers, and validate a code segment associated with the branch instruction, the code segment including code executed before the branch instruction and code executed after the branch instruction.

The instructions, when read and executed, may cause the processor to check the code segment for use of return-oriented programming techniques.

The instructions, when read and executed, may cause the processor to manage security policies for the system.

The instructions, when read and executed, may cause the processor to monitor the event for the branch instruction using binary translation-based techniques.

The instructions, when read and executed, may cause the processor to provide an event trigger from a monitoring extension to the processor, the event trigger for use in monitoring the event for the branch instruction. The event trigger may include a trigger when an instruction of a particular type is executed and/or a trigger invoking a registered callback for handling of the event.

The plurality of event identifiers may include process identifiers, thread identifiers, and/or register values.

The instructions, when read and executed, may cause the processor to invoke callbacks to the security module in order to perform checks when other criteria are met. For example, callbacks may be invoked upon stack pivot usage (e.g., a switch from using a legitimate, operating system-supplied stack of thread to an allocated stack), manipulation of return addresses already present in the call stack (e.g., overwriting return addresses placed in the stack legitimately), and/or other forms of illegitimate manipulation of call frames and/or call frame data. In some embodiments, these checks may be coupled with identification and examination of code at a destination of a new return address and/or a check of the legitimacy of identified code.

A method for assembling an execution profile of an event is disclosed. The method may include monitoring the event for a branch instruction, generating a callback to a security module upon execution of the branch instruction, filtering the callback according to a plurality of event identifiers, and validating a code segment associated with the branch instruction, the code segment including code executed before the branch instruction and code executed after the branch instruction.

The method may also include checking the code segment for use of return-oriented programming techniques, managing security policies for the system, monitoring the event for the branch instruction using binary translation-based techniques, and/or providing an event trigger from a monitoring extension to the processor, the event trigger for use in monitoring the event for the branch instruction.

The event trigger may include a trigger when an instruction of a particular type is executed and/or a trigger invoking a registered callback for handling of the event.

The plurality of event identifiers may include process identifiers, thread identifiers, and/or register values.

The method may also include invoking callbacks to the security module in order to perform cheeks when other criteria are met. For example callbacks may be invoked upon stack pivot usage (e.g., a switch from using a legitimate, operating system-supplied stack of thread to an allocated stack), manipulation of return addresses already present in the call stack (e.g., overwriting return addresses placed in the stack legitimately), and/or other of ms of illegitimate manipulation of call frames and/or call frame data. In some embodiments, these checks may be coupled with identification and examination of code at a destination of a new return address and/or a check of the legitimacy of identified code.

What is claimed:

1. A method for assembling an execution profile of an event, the method comprising:
   monitoring a process invoked in response to the event for a branch instruction;
   generating a callback to a security module upon execution of the branch instruction;
   filtering the callback according to filtering criteria that is dependent on a plurality of identifiers associated with the event; and
   validating, by the security module in response to the filtering criteria being met, a code segment associated with the branch instruction, the code segment including code executed before the branch instruction and code executed after the branch instruction, the validation including determining whether the code segment is associated with a manipulation of return addresses associated with branch instructions.

2. The method of claim 1, further comprising checking the code segment for use of return-oriented programming techniques.

3. The method of claim 1, further comprising managing security policies for the system.

4. The method of claim 1, further comprising monitoring the process invoked in response to the event for the branch instruction using binary translation-based techniques.

5. The method of claim 1, further comprising providing an event trigger from a monitoring extension to a processor, the event trigger for use in monitoring the process invoked in response to the event for the branch instruction.

6. The method of claim 1, further comprising providing an event trigger from a monitoring extension to a processor, the event trigger for use in monitoring the process invoked in response to the event for the branch instruction, wherein the event trigger comprises a trigger when an instruction of a particular type is executed.

7. The method of claim 1, further comprising providing an event trigger from a monitoring extension to a processor, the event trigger for use in monitoring the process invoked in response to the event for the branch instruction, wherein the event trigger comprises a trigger invoking a registered callback for handling of the event.

8. A system for securing an electronic device, comprising:
a memory;
a processor; and
one or more security agents including instructions resident in the memory and operable for execution by the processor, wherein the security agents are configured to:
assemble an execution profile of an event;
monitor a process invoked in response to the event for a branch instruction;
generate a callback upon execution of the branch instruction;
filter the callback according to filtering criteria that is dependent on a plurality of identifiers associated with the event; and
validate, in response to the filtering criteria being met, a code segment associated with the branch instruction, the code segment including code executed before the branch instruction and code executed after the branch instruction, the validation including determining whether the code segment is associated with a manipulation of return addresses associated with branch instructions.

9. The system of claim 8, wherein the security agents are further configured to check the code segment for use of return-oriented programming techniques.

10. The system of claim 8, wherein the security agents are further configured to access managing security policies for the system to assemble the execution profile.

11. The system of claim 8, wherein the security agents are further configured to monitor the process invoked in response to the event for the branch instruction using binary translation-based techniques.

12. The system of claim 8, wherein the security agents are further configured to access an event trigger from a monitoring extension of the processor to monitor the process invoked in response to the event for a branch instruction.

13. The system of claim 8, wherein the security agents are further configured to access an event trigger from a monitoring extension of the processor to monitor the process invoked in response to the event for a branch instruction, the event trigger based upon an instruction of a particular type is executed.

14. The system of claim 8, wherein the security agents are further configured to access an event trigger from a monitoring extension of the processor to monitor the process invoked in response to the event for a branch instruction, the event trigger invoking a registered callback for handling of the event.

15. At least one non-transitory machine readable storage medium, comprising computer-executable instructions carried on the machine readable medium, the instructions readable by a processor, the instructions, when read and executed, for causing the processor to:
assemble an execution profile of an event;
monitor a process invoked in response to the event for a branch instruction;
generate a callback to a security module upon execution of the branch instruction;
filter the callback according to filtering criteria that is dependent on a plurality of identifiers associated with the event; and
validate, by the security module in response to the filtering criteria being met, a code segment associated with the branch instruction, the code segment including code executed before the branch instruction and code executed after the branch instruction, the validation including determining whether the code segment is associated with a manipulation of return addresses associated with branch instructions.

16. The medium of claim 15, wherein the instructions further cause the processor to check the code segment for use of return-oriented programming techniques.

17. The medium of claim 15, wherein the instructions further cause the processor to monitor the process invoked in response to the event for the branch instruction using binary translation-based techniques.

18. The medium of claim 15, wherein the instructions further cause the processor to access an event trigger from a monitoring extension of the processor to monitor the process invoked in response to the event for a branch instruction.

19. The medium of claim 15, wherein the instructions further cause the processor to access an event trigger from a monitoring extension of the processor to monitor the process invoked in response to the event for a branch instruction, the event trigger based upon an instruction of a particular type is executed.

20. The medium of claim 15, wherein the instructions further cause the processor to access an event trigger from a monitoring extension of the processor to monitor the process invoked in response to the event for a branch instruction, the event trigger invoking a registered callback for handling of the event.

* * * * *